United States Patent
Zhang

(10) Patent No.: US 8,135,416 B2
(45) Date of Patent: Mar. 13, 2012

(54) METHOD AND ARRANGEMENT FOR DETERMINING TERMINAL POSITION

(75) Inventor: Yang Zhang, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/148,182

(22) PCT Filed: Feb. 11, 2009

(86) PCT No.: PCT/SE2009/050150
§ 371 (c)(1), (2), (4) Date: Aug. 5, 2011

(87) PCT Pub. No.: WO2010/093294
PCT Pub. Date: Aug. 19, 2010

(65) Prior Publication Data
US 2011/0300878 A1    Dec. 8, 2011

(51) Int. Cl.
*H04W 24/00* (2009.01)
(52) U.S. Cl. .................. 455/456.1; 455/404.2
(58) Field of Classification Search .................. None
See application file for complete search history.

(56) References Cited

U.S. PATENT DOCUMENTS

| | | |
|---|---|---|
| 2003/0139188 A1 | 7/2003 | Chen et al. |
| 2005/0053099 A1 | 3/2005 | Spear et al. |
| 2008/0014960 A1* | 1/2008 | Chou .................. 455/456.1 |
| 2010/0227628 A1* | 9/2010 | Anderson et al. .......... 455/456.3 |
| 2010/0234043 A1* | 9/2010 | Wigren et al. .............. 455/456.1 |

FOREIGN PATENT DOCUMENTS

EP    1545145 A1    6/2005

* cited by examiner

*Primary Examiner* — Ajit Patel
(74) *Attorney, Agent, or Firm* — Coats & Bennett, PLLC

(57) ABSTRACT

A Method and arrangement for determining the position of mobile terminals in a cell of a mobile communication network where time alignment (TA) is employed for terminal transmissions in timeslots to a serving base station. First, the distance to the base station is determined (200) for at least one mobile terminal in the call using a TA independent positioning method. A current TA value used by the at least one mobile terminal for time alignment of signal transmissions in an allocated timeslot, is also obtained (202). A relation between the determined TA independent distance and the obtained current TA value for each mobile terminal, is then estimated (204), and a TA bias of the cell is determined (206) based on the estimated relation. The position of any subsequent terminals can then be determined using a TA based positioning method and the TA bias, such that the current TA value used by the subsequent terminal is adjusted by the TA bias. Thereby, the TA based positioning method will become more closely related to the true terminal position.

18 Claims, 5 Drawing Sheets

METHOD AND ARRANGEMENT FOR DETERMINING TERMINAL POSITION

TECHNICAL FIELD

The present invention relates generally to a method and arrangement for determining the position of mobile terminals in a mobile network where time alignment is employed for terminal transmissions in timeslots.

BACKGROUND

Mobile networks are generally capable of providing information on the whereabouts of their subscribers, e.g. to an emergency facility, a traffic surveillance centre or other service unit needing or even requiring such positioning information. In general, mobile networks may sometimes be required to provide and certify the location or position of a subscriber in order to support emergency services and other location dependent services. Various positioning functions are therefore typically employed in the mobile networks for locating terminals connected to base stations in cells of the network.

These positioning functions may include simply identifying the cell currently serving a terminal of interest, which can provide an accurate enough position when the terminal is connected to a base station serving a relatively small cell, but not particularly accurate when connected to a base station serving a larger cell. A more accurate position may further be derived from a used timing advance when the serving cell is known and/or signal strength measurements on signals from different base station sites, the latter method being known as "triangulation".

The concept of time alignment or timing advance is generally used in mobile networks employing time division multiplexing where terminals sharing the same transmit frequency are directed to transmit their signals during allocated timeslots, commonly referred to as TDMA (Time Division Multiplex Access). FIG. 1a illustrates schematically how timing advance is used in a cell covered by a base station BS. Three mobile terminals A, B and C are currently connected to the serving base station BS, and different timeslots 100 are allocated to the terminals such that terminals A, B, C are directed to transmit signals "A", "B" and "C" in successive timeslots 100, respectively, as indicated in the figure. The terminals A-C are thus synchronised with BS to allow for proper timing of the transmission and reception of signals.

In this example, terminals A and C are located relatively close to BS, while terminal B is located at a greater distance from BS. As a result, the signals from terminals A and C will arrive basically "in time" to BS while the signals from terminal B would arrive somewhat late due to propagation delays, thus not exactly fitting into the allocated timeslot when received at BS, which could cause interference due to overlap with signals from terminal C in this case. In order to avoid such interference, BS orders terminal B to transmit its signals somewhat earlier by a parameter called Timing Advance TA. This mechanism is generally referred to as time alignment. Thus, by adjusting the timing of transmissions from terminal B in this way, the signals will arrive properly at BS in the allocated timeslot as indicated in the figure.

Although the parameter TA was originally conceived to adjust terminal transmissions to fit into a timeslot scheme at the receiving base station, TA has been frequently utilised to provide location information as well. As the propagation speed of radio signals is known to equal the speed of light C, the TA used by a specific terminal further implies the distance D between that terminal and the serving base station as D=C× TA. According to 3GPP ($3^{rd}$ Generation Partnership Project), TA is specified as an integer between 0 and 63 representing time steps in the interval 0 µs through 232 µs, each step thus representing approximately 3.7 µs which corresponds to 553 m of signal propagation. The location of a terminal can thus be estimated by knowing the location of the serving base station and the TA used. In many mobile systems, the base station's location is basically given by a parameter "CGI" (Cell Global Identity) providing the coordinates of the base station.

FIG. 1b illustrates that when a mobile terminal, not shown, is directed by a serving base station BS to use a specific timing advance value TA to adjust its transmissions, that TA value can further be used to calculate an expected terminal distance from BS as being within a potential position area P at a distance of TA×553 m from BS, according to 3GPP. If BS covers 360°, i.e. an omni cell, the terminal is presumably located somewhere within a circle area or ring P(Omni), while if BS covers a sector less than 360°, i.e. a sector cell, the terminal can be somewhere within a circle sector area P(Sector), as illustrated in the figure. For example, if TA=10, the terminal is expected to be located at a distance of around 5.5 km from the base station. Since TA is specified in 3GPP according to predefined integers, the expected terminal/base station distance can be determined within an uncertainty interval of 553 m.

The above positioning method is frequently used in GSM systems and other similar mobile systems using time alignment. Utilising the CGI/TA information for positioning is particularly attractive since it is promptly available at the serving base station or at a base station controller BSC, and no further measurements nor added functionality in terminals are necessary.

However, the CGI/TA based positioning method is sometimes not very accurate as the TA parameter is primarily determined to make terminal transmissions arrive in time for allocated timeslots at the base station, but not as a measure of distance. At present, mobile systems are not obliged to set the TA parameter for correct position determination. As a result, differently configured base stations, e.g. made by different vendors or operators, may consistently set different TA values for terminals located at the same distance, yet providing equivalent communication quality. This trait has actually been confirmed by field testing.

Using TA for terminal transmissions not only compensates for propagation of radio waves in the air but also for any delays due to propagation, switching and processing of signals within the base station, which may differ depending on the configuration of hardware and software in the base station. It is thus a problem that the CGI/TA based positioning method is not wholly reliable and may produce different results depending on base station configuration. It would be desirable to produce basically the same positioning results regardless of the equipment used.

SUMMARY

It is an object of the invention to address at least some of the problems outlined above, and to provide a solution for increasing accuracy and reliability when determining the position of mobile terminals. These objects and others may be obtained by providing a method and apparatus according to the attached independent claims.

According to one aspect, a method is provided for determining the position of mobile terminals in a cell of a mobile communication network where time alignment (TA) is employed for terminal transmissions in timeslots to a serving base station providing radio coverage in the cell. The distance to the base station is determined for at least one mobile terminal in the cell using a TA independent positioning method. A current TA value is also obtained that is used by the at least one mobile terminal for time alignment of signal transmissions in an allocated timeslot. Then, a relation between the determined TA independent distance and the obtained current TA value for each mobile terminal is estimated. A TA bias of the cell is further determined based on the estimated relation, and the position of a subsequent terminal is determined using a TA based positioning method and the TA bias such that the current TA value used by the subsequent terminal is adjusted by the TA bias. Thereby, the TA based positioning method will become more closely related to the true terminal position.

According to another aspect, an arrangement is provided in a positioning unit for determining the position of mobile terminals basically according to the method above. In this arrangement, the positioning unit comprises a distance determining unit adapted to determine the distance to the base station for at least one mobile terminal in the cell using a TA independent positioning method. The positioning unit further comprises an obtaining unit adapted to obtain a current TA value used by the at least one mobile terminal for transmission in an allocated timeslot. The positioning unit also comprises a logic unit adapted to estimate a relation between the determined TA independent distance and the obtained current TA value for each mobile terminal, and to determine a TA bias of the cell based on the estimated relation. The positioning unit also comprises a position determining unit adapted to determine subsequent terminal positions using a TA based positioning method and the TA bias.

The method and arrangement above can be implemented according to different embodiments. In one embodiment, the logic unit estimates the relation by translating each determined TA independent distance into a TA value that is compared with the obtained current TA value used for signal transmissions. In that case, the logic unit can determine the TA bias of the cell based on the deviation of the TA value used for signal transmissions from the translated TA value.

In another embodiment, the logic unit estimates the relation by translating each obtained TA value into a TA based distance that is compared with the corresponding determined TA independent distance. In that case, the logic unit can determine the TA bias of the cell based on the deviation of the translated TA based distance from the determined TA independent distance.

In further embodiments, the obtaining unit obtains the current TA value from a base station controller in signalling messages of a positioning method according to any of: CGI/TA, U-TDOA and a satellite based navigation or positioning system.

In yet another embodiment, a sequence of TA and D (terminal/base station distance) pairs $\{TA(i), D(i)\}$, $i=1 \ldots N$ are obtained for a plurality of mobile terminals in the cell, and the TA bias of the cell is determined by performing a search for a Minimum Mean Absolute Error (MMAE), using the $\{TA,D\}$ pairs as input in a formula of Mean Absolute Error "MAE" defined as:

$$MAE = \frac{1}{N}\sum_{i=1}^{N} \text{abs}\left(TA(i) - \text{round}\left(\frac{2}{C*Tc}D(i) + \text{bias}\right)\right) \quad (1)$$

Where:

"round" is an operator of rounding to the nearest integer.
"abs" is an operator providing an absolute value.
"bias" is a TA bias variable for MMAE searching.
"C" is the speed of light.
"Tc" is a time interval corresponding to 1 TA step.

In the embodiment above, a range of TA values may be selected within which the MMAE search is executed, and an MAE value may be calculated using different candidate TA bias values and the $\{TA,D\}$ pairs as input to (1). A search for MMAE among the calculated and stored values of MAE can then be performed and the TA bias value that provides the MMAE can be used as the TA bias of the cell for position determination using the TA based positioning method.

Further features and benefits of the invention will become apparent from the detailed description below.

BRIEF DESCRIPTION OF THE DRAWINGS

Exemplary embodiments of the invention will now be described in more detail and with reference to the accompanying drawings, in which.

DETAILED DESCRIPTION

A mechanism and procedure are provided which can basically be used to obtain better accuracy when determining the position of mobile terminals in a mobile network that employs time alignment. Briefly described, this solution can make the TA parameter more closely related to the true distance between a mobile terminal and its serving base station, thereby providing more accurate and reliable position determination based on the TA value currently used for a terminal of interest.

In order to calibrate the TA parameter for a specific cell, the distance between a mobile terminal in the cell and the base station is determined using a TA independent positioning method that is preferably more reliable and accurate than any TA based positioning method. The TA value currently valid for the terminal's signal transmissions is also obtained and stored together with the associated distance determined by the TA independent method. The relation between the obtained current TA value and determined distance is also estimated from stored TA/distance pairs obtained and determined for a plurality of terminals. A general TA bias is then determined for the cell based on the estimated TA/distance relation.

Effectively, the TA bias represents a deviation between a current TA value and the actual distance to the base station for a terminal using that TA value for transmissions. The determined TA bias can then be used as a calibration parameter for position determination using a TA based positioning method. For example, the TA bias can be used to adjust the currently valid TA value for any subsequent terminal in the cell, and that terminal's position is then determined based on the adjusted TA value using the TA based positioning method. Thereby, the TA values used in a particular cell for time alignment of terminal transmissions in timeslots, are adjusted to be more accurate for positioning by being more closely related to the true geographical distance between connected terminals and the base station.

Figure 2:
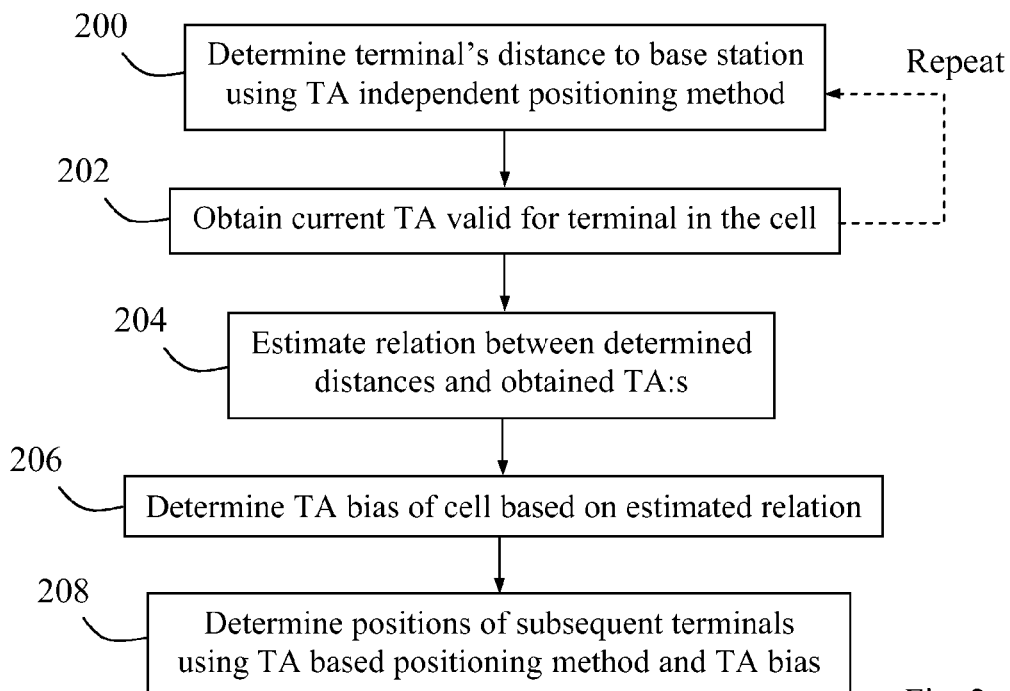
FIG. 2 is a flow chart illustrating a procedure for increasing the accuracy for determining the position of a mobile terminal, according to one exemplary embodiment.

An exemplary procedure for determining the position of mobile terminals in a cell will now be described with reference to a flow chart shown in FIG. 2. The cell belongs to a mobile communication network where time alignment is generally employed for terminal transmissions in timeslots to a serving base station providing radio coverage in the cell. The shown procedure may be executed by a positioning unit or the like serving the mobile network.

In a first step 200, the distance between the base station and a terminal connected thereto is determined using a TA independent positioning method, which preferably has a higher accuracy and reliability than a TA based positioning method. This distance is thus calculated between the terminal's position determined by the TA independent method and the base station's position which can be derived from a known CGI parameter or is otherwise known in the network.

Figure 1A:
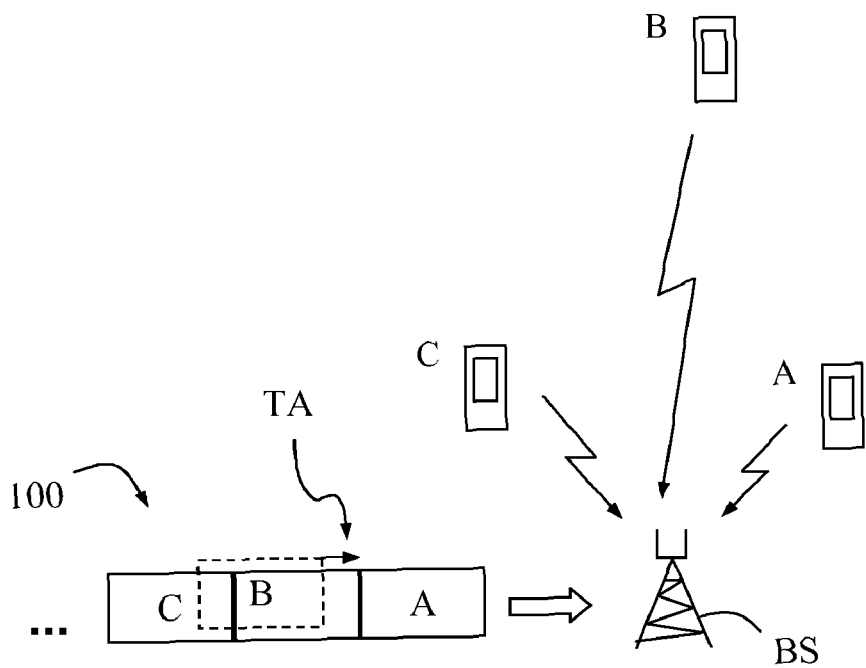
FIGS. 1a and 1b are schematic illustrations of how time alignment is used according to general practice.
Figure 1B:
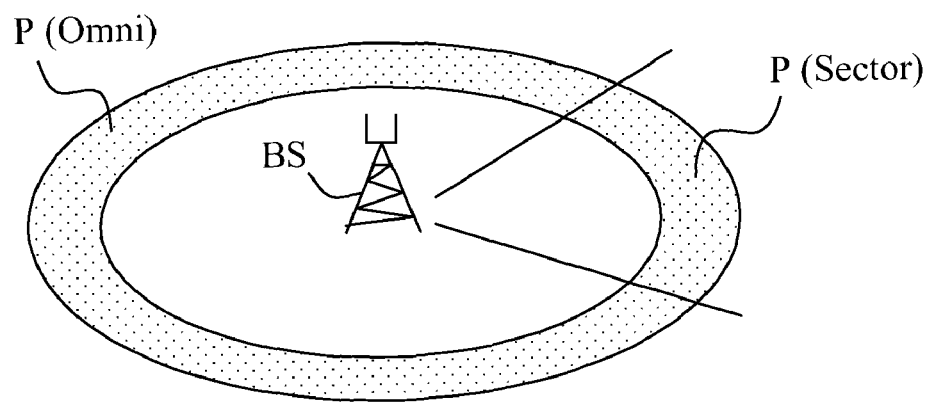

A TA value which is valid for the terminal for time alignment of signal transmissions during an allocated timeslot, is obtained from the network in a next step 202 and stored together with the distance determined in step 200, to form a TA/distance pair. It is thus assumed that the mobile terminal has been directed by the serving base station to use a suitable selected TA value in a conventional manner to adjust the timing of its transmissions to fit into the allocated timeslot, i.e. basically as described above for FIG. 1a. The currently used TA value can normally be obtained from the serving base station, or from a BSC or other similar node controlling the base station depending on the network configuration.

Steps 200-202 are then repeated for a plurality of mobile terminals connected to the base station and using various TA values for uplink time alignment, depending on signal propagation delays. Thereby, a plurality of TA/distance pairs are collected to form a basis for determining a general TA bias for the cell representing a deviation of the network obtained TA parameter from the true distance between terminal and base station.

It is thus assumed that the position determined by the TA independent positioning method is closely related to the terminal's true position, whereas the obtained TA value corresponds to a position deviating from the true position. Thus, the distance determined in step 200 is a more or less "true" distance to the base station. It should be noted that the TA value obtained in step 202 should be valid for the terminal basically at the same time as the TA independent positioning method is used according to step 200. In some systems, the TA value can be extracted from signalling messages communicated for the positioning procedure, which will be described in more detail further on in this disclosure.

In a further step 204, a relation is generally estimated between the network obtained TA values and associated distances to the base station as determined by using the TA independent positioning method according to step 200. According to a first alternative, this relation may be estimated by translating each determined "true" distance into a TA value that is compared with the corresponding TA value used for time alignment. According to a second alternative, the relation in step 204 may be estimated by translating each obtained TA value into a TA based distance that is compared with the corresponding "true" distance determined for the terminal according to the TA independent positioning method.

A general TA bias is then determined for the cell in a next step 206, based on the estimated relation between determined distances and associated TA values. In the first alternative above, the TA bias may be determined based on the deviation of the TA value used for transmission from the translated TA value. In the second alternative above, on the other hand, the TA bias may be determined based on the deviation of the translated distance from the determined "true" distance.

The determined TA bias can finally be used when determining any subsequent terminal position by the conventional TA based positioning method, as shown in a final step 208. For example, the TA value currently used for a terminal of interest for time alignment can be adjusted by the TA bias to be more closely related to the true distance between the terminal and its serving base station, to form an adjusted TA value which is used as input to the TA based positioning method. Alternatively, the TA bias can be translated into a distance deviation that is added or deducted from the position determined from the TA value used for transmission.

Thereby, a more accurate and reliable position determination can be provided when only using the TA based positioning method for terminals served by the base station in the cell. Thus, steps 200-206 can be seen as a calibration procedure for the cell, while step 208 utilizes the calibration for simple yet accurate and reliable position determination. While the TA bias is determined exclusively based on conditions in that cell, it may be suitable to use the same TA bias in other cells as well, e.g. if the conditions for signal propagation and processing are considered to be basically similar in those cells.

It should be noted that if a greater number of such TA/distance pairs are collected in steps 200 and 202, the more accurate overall TA bias will be obtained for the cell. In practice, the TA bias of a cell can be determined in different ways. For example, the relation between obtained TA values and corresponding determined distances can be estimated by simply calculating a deviation of each collected TA/distance pair and then averaging the multiple calculated deviations. The calculated mean deviation can be translated into a time value that constitutes the general TA bias of the cell. It is also possible to determine the TA bias by searching for a Minimum Mean Absolute Error (MMAE) of a sequence of TA samples and associated distances, which will be described in more detail below.

Figure 3:
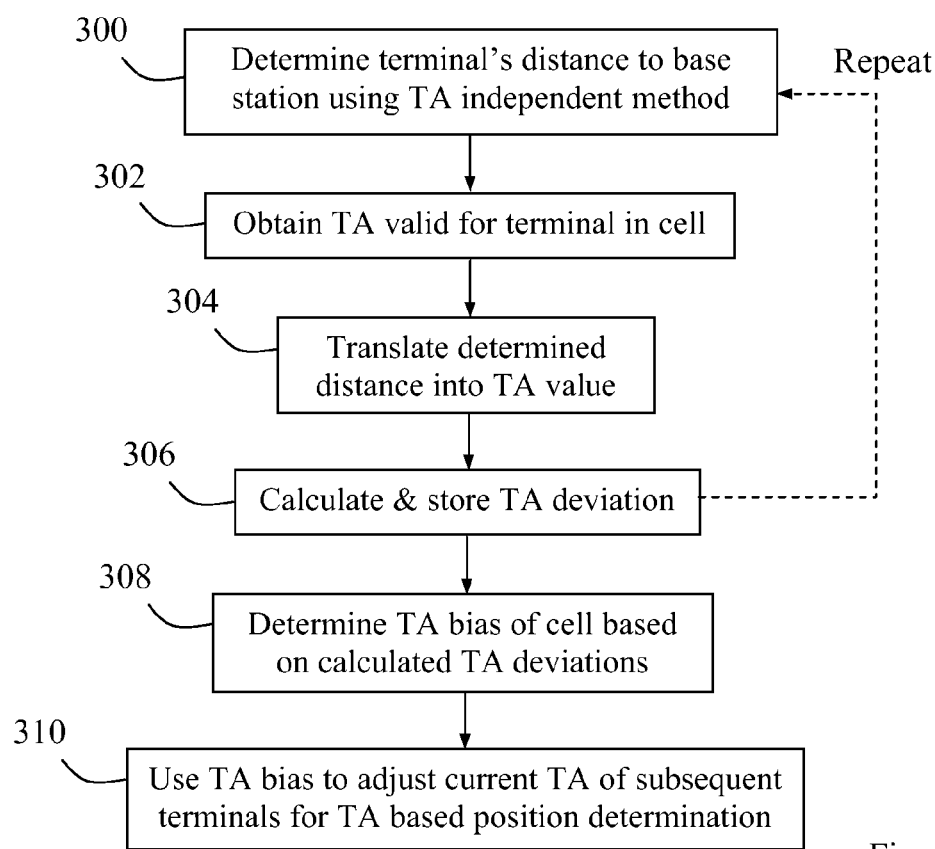
FIG. 3 is a flow chart illustrating a procedure for increasing the accuracy for determining the position of a mobile terminal, according to another embodiment.

Another exemplary procedure in a positioning unit for determining the position of mobile terminals in a cell covered by a base station, will now be described with reference to a flow chart shown in FIG. 3. In a first step 300, the distance between a terminal and the base station is determined using a TA independent positioning method, as in step 200 above, presumably being closely related to the terminal's true position. A TA value used by the terminal for time alignment in the cell is also obtained in a next step 302, as in step 202 above.

In a further step 304, the distance to the base station determined in step 300, is translated into a corresponding TA value. Then, a deviation between the translated TA value and the TA value used for time alignment is calculated and stored in a step 306.

Steps 300-306 are then basically repeated for a plurality of mobile terminals connected to the base station and using various different TA values for uplink time alignment. It should be noted that step 302 can be executed after or at the same time as step 304, since translating the "true" distance into a TA value and obtaining a TA value used for time alignment, can be made independently in this example. However, the TA value obtained in step 302 should be valid for the terminal basically at the same time as the TA independent positioning method is used according to step 300, that is, the terminal should be in chiefly the same position at steps 300 and 302.

In this way, a basis is formed for determining a general TA bias of the cell, in a further step 308, based on stored deviations in the distance between the two positioning methods as calculated for different mobile terminals according to the foregoing steps. The TA bias can be estimated by simply averaging the multiple deviations calculated and stored according to step 306, and then translating the mean deviation into a time value that constitutes the general TA bias of the cell.

The determined TA bias can now be applied in a final step 310 to adjust a current TA value of any subsequent terminal and then use the adjusted TA value as input to the TA based positioning method, in order to provide a more accurate position for the terminal.

Figure 4:
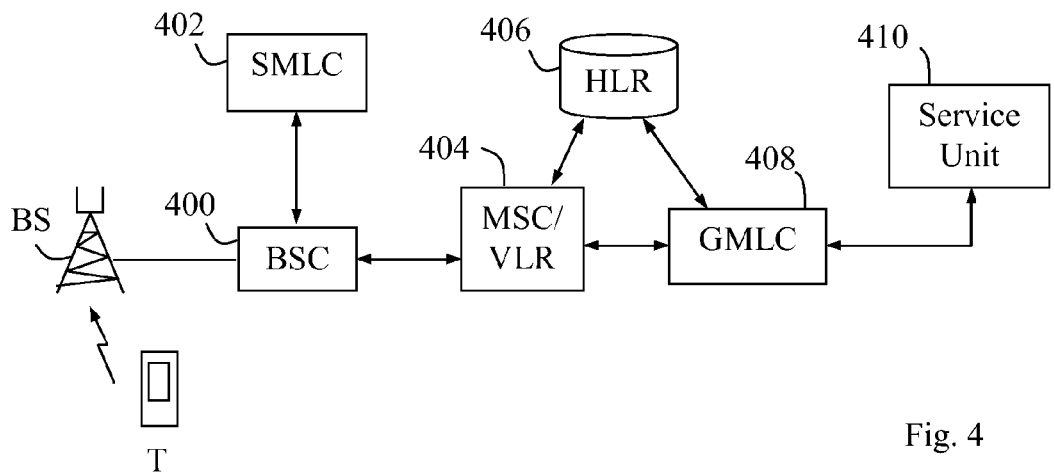
FIG. 4 is a schematic view illustrating a network configuration that can be used for implementing the invention, according to another exemplary embodiment.

FIG. 4 illustrates a possible network scenario in which the present solution can be implemented. A BSC 400 controls a base station BS to which a terminal T is connected using a TA value for time alignment of uplink signal transmissions. A positioning unit denoted SMLC (Serving Mobile Location Centre) 402 is connected to the BSC 400 and is adapted to execute the positioning process of the present solution, e.g. according to either of FIG. 2 and FIG. 3.

BSC 400 and its base stations belong to a mobile network that further includes an MSC/VLR (Mobile Switching Centre/Visited Location Register) node 404, an HLR (Home Location Register) 406 and a GMSC (Gateway MSC) 408. An external service unit 410 is able to request for the position of various mobile terminals served by the network, such as the shown terminal T. Service unit 410 may be an emergency centre or any application generally providing services requiring the position of terminals, which is however outside the scope of the present description.

The GMLC 408 is the first access node for the service unit 410 and is able to request for routing information from the HLR 406 over an Lh interface. GMLC 408 may also send positioning requests to the MSC/VLR node 404 and receive location estimates based on the TA based method, over an Lg interface. The SMLC 402 manages the overall co-ordination and scheduling of resources needed for locating a terminal. It may also be configured to calculate the final location and velocity estimate and may further also estimate the achieved accuracy. Since SMLC 402 needs to frequently obtain location related information (e.g. CGI and TA) of terminals, it is preferably directly connected to BSC 400.

During a positioning procedure, GMLC 408 may authenticate a positioning request from service unit 410 and forward it to BSC 400 via MSC/VLR 404 across the A, Gb or Iu interface. BSC 400 then passes the request to the SMLC 402 for processing according to the described embodiments.

Figure 5:
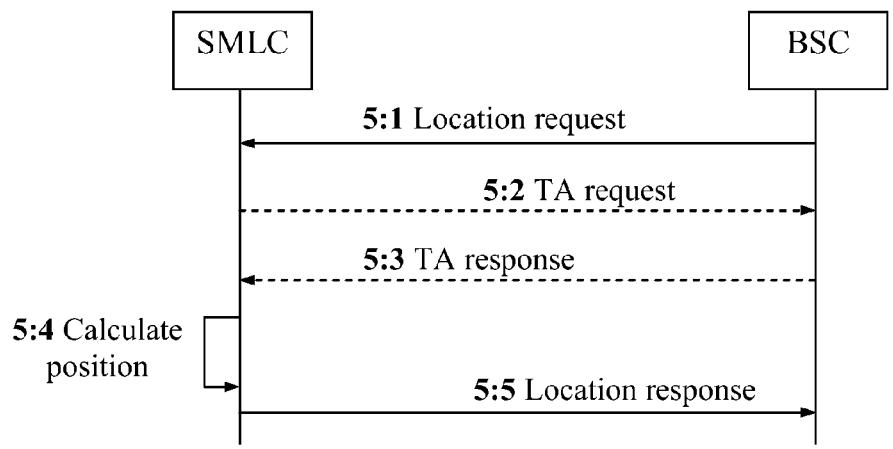
FIGS. 5-7 are signalling diagrams which can be used to provide the position of a mobile terminal, according to some further embodiments.
Figure 6:
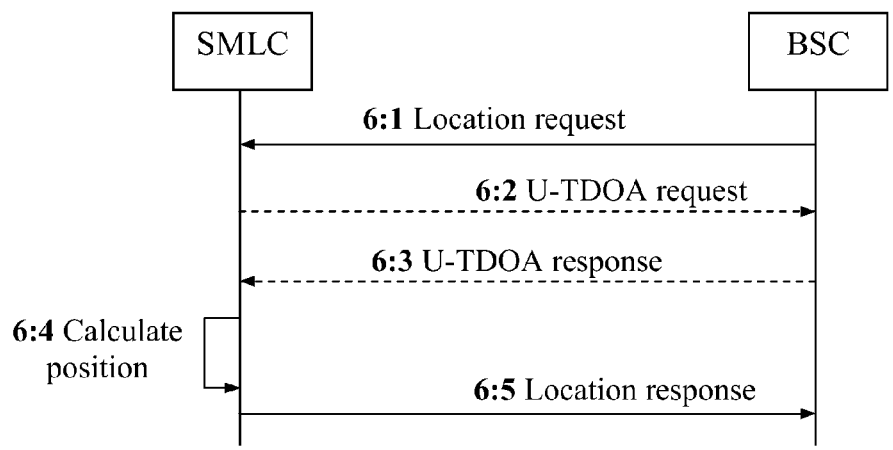
Figure 7:
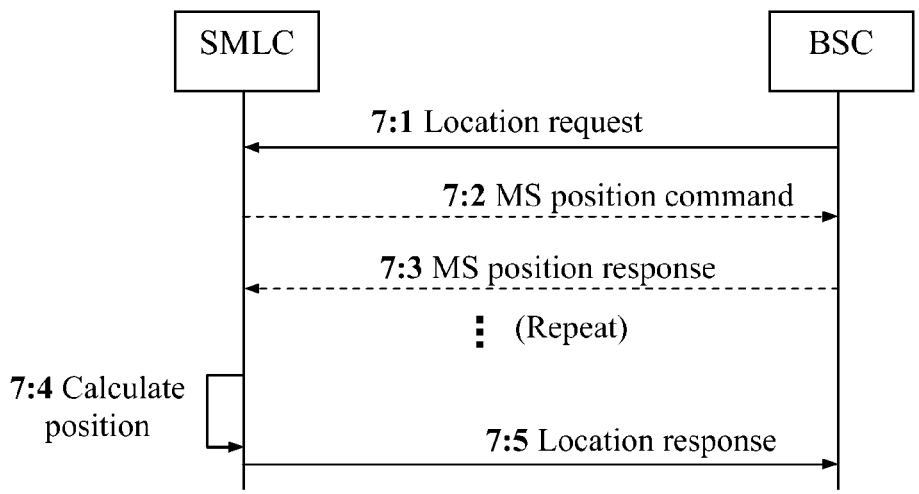

FIGS. 5-7 are signalling diagrams illustrating how the SMLC can obtain a TA value currently used for time alignment from the BSC, e.g. as indicated in steps 202 and 302 above. FIG. 5 relates to a practical case when the CGI/TA based positioning method is used. The BSC forwards a "perform location request" 5:1 to the SMLC, originally coming from a service unit, not shown, to obtain the position of a terminal. The TA value is an optional element in the location request procedure. Otherwise, a separate TA request 5:2 may be sent from the SMLC to the BSC, and a TA response 5:3 is then conveyed in return to the SMLC. After calculating the terminal's position in a schematic step 5:4 according to the procedure described above, the SMLC provides a "perform location response" 5:5 to the BSC.

FIG. 6 relates to another practical case when a so-called U-TDOA (Uplink Time Difference Of Arrival) based positioning method is used. The BSC forwards a "perform location request" 6:1 to the SMLC, to obtain the position of a terminal. According to the U-TDOA method, a U-TDOA request 6:2 is sent from the SMLC to the BSC, basically requesting for various physical channel information (frequencies, hopping sequence, channel type, timeslot, sub-channel number, etc), the used MS (Mobile Station) power, a cell identifier and the current TA value. This information is generally useful for U-TDOA measurements, not necessary to describe here further. A TA response 6:3 with the requested information is then conveyed in return to the SMLC. After calculating the terminal's position in a schematic step 6:4 according to the procedure described above, the SMLC provides a "perform location response" 6:5 to the BSC.

FIG. 7 relates to another practical case when a satellite based positioning method is used, sometimes referred to as "AGPS/AGNSS" (Assisted GPS/Assisted GNSS) where the term GNSS (Global Navigation Satellite System) generally represents any satellite based navigation or positioning systems, such as GPS, Gallileo, etc. In the case of GPS, AGPS or so-called "autonomous" GPS may be used.

The BSC forwards a "perform location request" 7:1 to the SMLC, to obtain the position of a terminal. In this case, the SMLC needs to deliver instruction assistance data to the terminal which needs to request for further assistance data or send back a positioning result to the SMLC. This information can be delivered through the protocol RRLP (Radio Resource LCS (Location Services) Protocol), and an RRLP message can be encapsulated in the messages "MS Position Command" 7:2 and "MS Position Response" 7:3.

For each satellite based positioning attempt, a few "MS Position Command/Response" message pairs 7:2, 7:3 will typically be exchanged between SMLC and BSC, as indicated in the figure. The "MS Position Response" 7:3 will not only include the RRLP message but also an optional TA value element, which can thus be used to accomplish steps 202 and 302 above. After calculating the terminal's position in a schematic step 7:4 according to the procedure described above, the SMLC provides a location response 7:5 to the BSC.

A practical example of how a more accurate TA based position adjusted by a TA bias can be obtained, will now be described in more detail with reference to the flow chart shown in FIG. 8. In this example, the TA bias is estimated by performing a search for a Minimum Mean Absolute Error "MMAE", using a sequence of available TA and D (terminal/base station distance) pairs $\{TA(i), D(i)\}$, $i=1 \ldots N$ as input in the formula (1) below. The available $\{TA,D\}$ pairs may have been obtained according to the above steps 200, 202 and 300, 302, respectively. The Mean Absolute Error "MAE" can thus be defined as:

$$MAE = \frac{1}{N} \sum_{i=1}^{N} \text{abs}\left(TA(i) - \text{round}\left(\frac{2}{C*Tc}D(i) + \text{bias}\right)\right) \quad (1)$$

Where:
"round" is an operator of rounding to the nearest integer.
"abs" is an operator providing an absolute value.
"bias" is a candidate TA bias value for MMAE searching.

"C" is the speed of light.

"Tc" is a time interval corresponding to 1 TA step.

Figure 8:
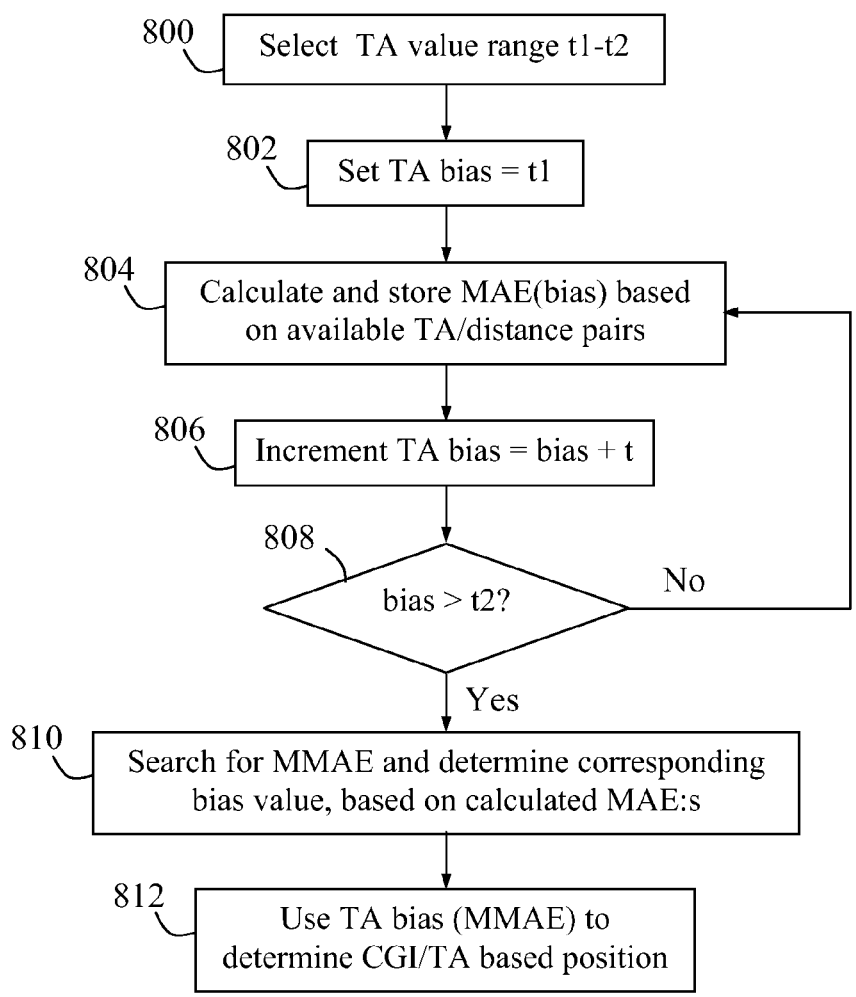
FIG. 8 is a flow chart illustrating a procedure for obtaining a TA based position adjusted by a determined TA bias, according to yet another possible embodiment.

The procedure of FIG. 8 basically involves a search for a TA bias that provides a minimum value of MAE in (1), i.e. the MMAE. In a first step 800, a rough range of candidate TA values t1-t2 is selected within which the MMAE search is to be executed. The search then starts from a first candidate TA bias value t1 which is set in a next step 802. An MAE value is calculated in a step 804, using the candidate TA bias value t1 and the available {TA,D} pairs as input to formula (1). In a next step 806, the TA bias is incremented by one step t to provide a new candidate TA bias value t1+t. If in a following step 808 the TA bias has not exceeded the upper range limit t2, i.e. "No" in step 808, the calculation of step 804 is repeated for the new candidate TA bias=bias+t and the TA bias is further incremented in step 806, and so forth.

Eventually, when the TA bias has been incremented to exceed t2, resulting in "Yes" in step 808, the MAE has been calculated for the entire range of t1-t2. A search for MMAE among the calculated and stored values of MAE from step 804, is then performed in a further step 810. A TA bias value that corresponds to the MMAE is then determined as the calibration parameter that will provide the most accurate position determination using the TA based positioning method. In a final shown step 812, the determined TA bias value corresponding to MMAE is used to adjust a current TA value of any subsequent terminal, for input to the TA based positioning method, thereby providing a more accurate position for the terminal.

Figure 9:
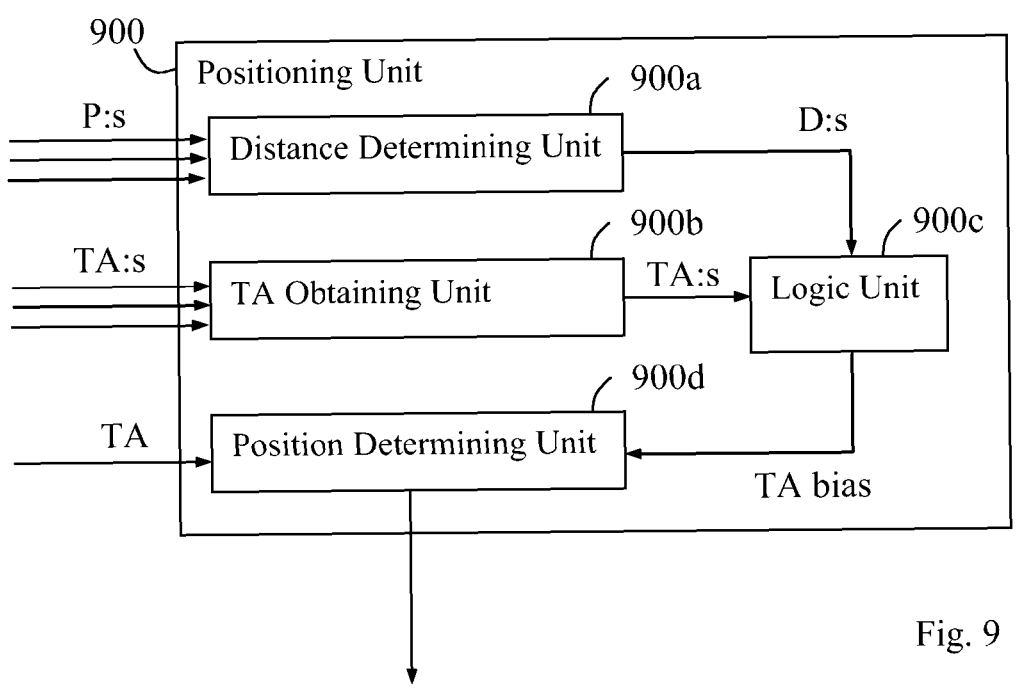
FIG. 9 is a block diagram illustrating a positioning unit in more detail, according to yet another embodiment.

An arrangement in a positioning unit for determining the position of mobile terminals in a cell of a mobile communication network, will now be described in more detail with reference to the block diagram illustrated in FIG. 9. It is assumed that time alignment is employed for terminal transmissions in timeslots to a serving base station providing radio coverage in the cell.

The positioning unit 900, which may be the SMLC 402 in FIG. 4, comprises a distance determining unit 900a adapted to determine the distance D to the base station for at least one mobile terminal in the cell using a TA independent positioning method. Positioning unit 900 further comprises an obtaining unit 900b adapted to obtain a current TA value used by the at least one mobile terminal for signal transmissions in an allocated timeslot.

Positioning unit 900 further comprises a logic unit 900c adapted to estimate a relation between the determined TA independent distance and the obtained current TA value for each mobile terminal. Logic unit 900c is also adapted to determine a general TA bias of the cell based on the estimated relation. Positioning unit 900 further comprises a position determining unit 900d adapted to determine positions of any subsequent terminals using a TA based positioning method and the TA bias.

The logic unit 900c may also be adapted to estimate the relation by translating each determined TA independent distance into a TA value that is compared with the obtained current TA value used for signal transmissions. In that case, the logic unit 900c may be further adapted to determine the TA bias of the cell based on the deviation of the TA value used for signal transmissions from the translated TA value.

The logic unit 900c may also be adapted to estimate the relation by translating each obtained TA value into a TA based distance that is compared with the corresponding determined TA independent distance. In that case, the logic unit 900c may be further adapted to determine the TA bias of the cell based on the deviation of the translated TA based distance from the determined TA independent distance.

The obtaining unit 900b may be further adapted to obtain the current TA value from a base station controller in signalling messages of a positioning method according to any of: CGI/TA, U-TDOA and any satellite based navigation or positioning system.

The above-described embodiments can provide a mechanism for using a more accurate TA value for positioning determination according to the TA based method. The adjusted TA value used as input to the TA based method may be any value not limited to integers. The conventional CGI/TA positioning method can thus be given significantly improved accuracy without introducing extra signalling traffic.

Further, by combining the output of a TA independent positioning method with TA values obtained from signalling messages during the positioning procedure, a database can be easily populated with distance/TA pairs without human effort. The impact of TA value fluctuation due to radio access network implementation can also be reduced, and the CGI/TA positioning method will become more robust. The above-described solution can further be applied for any mobile communication system using the timing advance mechanism, e.g. GSM and E-UTRAN.

While the invention has been described with reference to specific exemplary embodiments, the description is in general only intended to illustrate the inventive concept and should not be taken as limiting the scope of the invention. Further, the invention is not limited to any particular cellular networks, TA independent positioning methods or standards, and may be used for providing improved positioning accuracy for any type of mobile network employing time alignment. The present invention is defined by the appended claims.

The invention claimed is:

1. A method of determining positions of mobile terminals in a cell of a mobile communication network where time alignment (TA) is employed for terminal transmissions in timeslots to a serving base station providing radio coverage in said cell, the method comprising:
   determining a TA independent distance (D) to the base station for at least one mobile terminal in the cell using a TA independent positioning method;
   obtaining a current TA value used by the at least one mobile terminal for time alignment of uplink signal transmissions in an allocated timeslot;
   estimating a relation between the determined TA independent distance and the obtained current TA value for each of the at least one mobile terminals;
   determining a TA bias of the cell based on the estimated relation as a calibration parameter for position determination of any mobile terminals in said cell using a TA based positioning method;
   determining a position of a subsequent mobile terminal using the TA based positioning method and said TA bias such that a current TA value used by the subsequent terminal is adjusted by the TA bias and the position of said subsequent mobile terminal is determined based on the adjusted TA value.

2. The method according to claim 1, wherein estimating said relation comprises translating each determined TA independent distance into a translated TA value that is compared with the obtained current TA value used for signal transmissions.

3. The method according to claim 2, wherein determining the TA bias of the cell comprises determining the TA bias of the cell based on a deviation of the current TA value used for signal transmissions from the translated TA value.

4. The method according to claim 1, wherein estimating said relation comprises translating each current TA value into a translated TA based distance that is compared with the corresponding determined TA independent distance.

5. The method according to claim 4, wherein determining the TA bias of the cell comprises determining the TA bias of the cell based on a deviation of the translated TA based distance from the determined TA independent distance.

6. The method according to claim 1, wherein obtaining the current TA value comprises obtaining the current TA value from a base station controller in signalling messages of a positioning method according to any of: a Cell Global Identity (CGI)/TA, an Uplink Time Difference of Arrival (U-TDOA), and any satellite based navigation or positioning system.

7. The method according to claim 1, further comprising obtaining a sequence of TA and D (terminal/base station distance) pairs {TA(i), D(i)}, i=1 . . . N for a plurality of mobile terminals in the cell, wherein determining the TA bias of the cell comprises performing a search for a Minimum Mean Absolute Error (MMAE), using said {TA,D} pairs as input in a formula of Mean Absolute Error "MAE" defined as:

$$MAE = \frac{1}{N}\sum_{i=1}^{N} \text{abs}\left(TA(i) - \text{round}\left(\frac{2}{C*Tc}D(i) + \text{bias}\right)\right), \quad (1)$$

where:
"round" is an operator of rounding to the nearest integer,
"abs" is all operator providing an absolute value,
"bias" is a TA bias variable for MMAE searching,
"C" is the speed of light,
"Tc" is a time interval corresponding to 1 TA step.

8. The method according to claim 7, further comprising selecting a range of TA values (t1-t2) within which the MMAE search is executed, and calculating MAE values using different candidate TA bias values and said {TA,D} pairs as input to (1).

9. The method according to claim 8, wherein determining the TA bias of the cell comprises selecting, from among the calculated MAE values, the TA bias that provides the MMAE.

10. An arrangement in a positioning unit configured to determine positions of mobile terminals in a cell of a mobile communication network where time alignment (TA) is employed for terminal transmissions in timeslots to a serving base station providing radio coverage in said cell, the arrangement comprising:
a distance determining unit configured to determine a TA independent distance (D) to the base station for at least one mobile terminal in the cell using a TA independent positioning method;
an obtaining unit configured to obtain a current TA value used by the at least one mobile terminal for time alignment of uplink signal transmissions in an allocated timeslot;
a logic unit configured to estimate a relation between the determined TA independent distance and the obtained current TA value for each of the at least one mobile terminals, and to determine a TA bias of the cell based on the estimated relation as a calibration parameter for position determination of any mobile terminals in said cell using a TA based positioning method; and
a position determining unit configured to determine a position of a subsequent mobile terminal using the TA based positioning method and said TA bias by adjusting a current TA value used by the subsequent terminal by the TA bias and determining the position of said subsequent mobile terminal based on the adjusted TA value.

11. The arrangement according to claim 10, wherein the logic unit is configured to estimate said relation by translating each determined TA independent distance into a translated TA value that is compared with the obtained current TA value used for signal transmissions.

12. The arrangement according to claim 11, wherein the logic unit is configured to determine the TA bias of the cell based on a deviation of the current TA value used for signal transmissions from the translated TA value.

13. The arrangement according to claim 10, wherein the logic unit is configured to estimate said relation by translating each current TA value into a translated TA based distance that is compared with the corresponding determined TA independent distance.

14. The arrangement according to claim 13, wherein the logic unit is configured to determine the TA bias of the cell based on a deviation of the translated TA based distance from the determined TA independent distance.

15. The arrangement according to claim 10, wherein the obtaining unit is configured to obtain the current TA value from a base station controller in signalling messages of a positioning method according to any of: a Cell Global Identity (CGI)/TA, an Uplink Time Difference of Arrival (U-TDOA), and any satellite based navigation or positioning system.

16. The arrangement according to claim 10, wherein the logic unit is further configured to to obtain a sequence of TA and D (terminal/base station distance) pairs {TA(i), D(i)}, i=1 . . . N for a plurality of mobile terminals in the cell, wherein the logic unit determines the TA bias of the cell by performing a search for a Minimum Mean Absolute Error (MMAE), using said {TA,D} pairs as input in a formula of Mean Absolute Error "MAE" defined as:

$$MAE = \frac{1}{N}\sum_{i=1}^{N} \text{abs}\left(TA(i) - \text{round}\left(\frac{2}{C*Tc}D(i) + \text{bias}\right)\right), \quad (1)$$

where:
"round" is an operator of rounding to the nearest integer,
"abs" is an operator providing an absolute value,
"bias" is a TA bias variable for MMAE searching,
"C" is the speed of light,
"Tc" is a time interval corresponding to 1 TA step.

17. The arrangement according to claim 16, wherein the logic unit is further configured to select a range of TA values (t1-t2) within which the MMAE search is executed, and to calculate MAEs value using different candidate TA bias values and said {TA,D} pairs as input to (1).

18. The arrangement according to claim 17, wherein the logic unit is configured to determine the TA bias of the cell by selecting, from among the calculated MAE values, the TA bias value that provides the MMAE.

* * * * *

UNITED STATES PATENT AND TRADEMARK OFFICE
CERTIFICATE OF CORRECTION

PATENT NO. : 8,135,416 B2  Page 1 of 1
APPLICATION NO. : 13/148182
DATED : March 13, 2012
INVENTOR(S) : Zhang It is certified that error appears in the above-identified patent and that said Letters Patent is hereby corrected as shown below:

In Column 8, Line 27, delete "Gallileo," and insert -- Galileo, --, therefor.

In Column 12, Line 33, in Claim 16, delete "to to obtain" and insert -- to obtain --, therefor.

Signed and Sealed this
Twelfth Day of June, 2012

David J. Kappos
*Director of the United States Patent and Trademark Office*